UNITED STATES PATENT OFFICE.

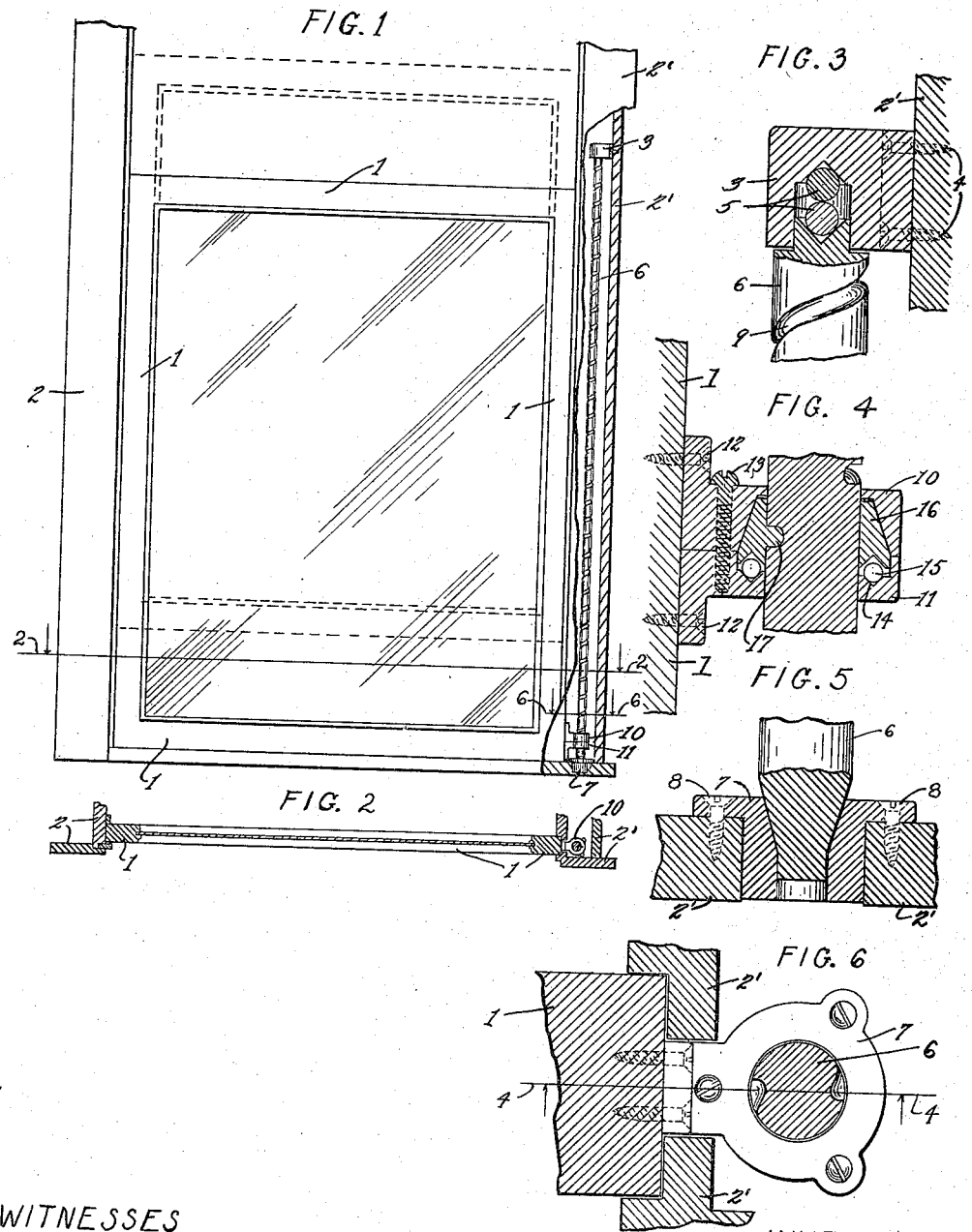

ERNEST SCHOENHEIT, OF AMBRIDGE, PENNSYLVANIA.

SASH-BALANCE.

1,147,271. Specification of Letters Patent. Patented July 20, 1915.

Application filed March 6, 1914, Serial No. 822,867. Renewed December 15, 1914. Serial No. 877,456.

*To all whom it may concern:*

Be it known that I, ERNEST SCHOENHEIT, a citizen of the United States, residing at Ambridge, in the county of Beaver and State of Pennsylvania, have invented certain new and useful Improvements in Sash-Balances, of which the following is a specification.

This invention relates to improvements in sash balances and its object is to produce a sash balance provided with an automatic traveling friction lock whereby the sash may be locked in an open position in its casing.

This invention is a modification of my copending application for improvement in sash-holders, Serial Number 752,577, filed March 7, 1913.

The invention consists in the combination and arrangement of parts to be hereinafter fully described in the following specification, pointed out in the claims and illustrated in the accompanying drawing which forms a part of said specification and in which—

Figure 1 is a front elevation, partly in section, of a window embodying my improvements. Fig. 2 is a cross section taken on line 2—2 of Fig. 1. Fig. 3 is a detail, in section, of the upper bearing. Fig. 4 is a detail, in section, of the traveling friction bearing and automatic friction lock and is taken on line 4—4 of Fig. 6. Fig. 5 is a section detail of the lower friction bearing. Fig. 6 is a section taken on line 6—6 of Fig. 1.

Like reference characters indicate corresponding parts throughout the several views.

1 is a vertically movable window frame disposed in the casing 2, 2'. Within the side 2' of the casing a hollow inverted bearing 3 is secured by screws or other fastening means 4 and ball bearings 5 are disposed in said bearing to receive the recessed extremity of a shaft 6 which is also projected into said bearing. The shaft 6 extends from the inverted bearing 3 to and into a lower bearing 7 also disposed within the window casing and secured thereto by suitable fastening means 8 and said shaft is formed with a spiral groove 9 extending from end to end of the same.

Near the base of the window frame and to one lateral edge of the same a bearing comprising two separable cups 10, and 11 is secured by suitable fastening means 12 and said bearing portions are connected by a screw 13 and the lower portion of the bearing or cup 11 is formed with a circular ball race 14 in which ball bearings 15 are disposed and in the hollow portions of said bearing a friction clutch 16 is disposed provided with a tooth 17 adapted to ride in the grooved portion 9 of the shaft 6. The clutch 16 is positioned immediately above the ball bearings 15 and is of such a size or vertical diameter with relation to the hollowed portion of the bearing as to permit a limited movement in a vertical plane independently of said bearing. The clutch is beveled from its lower toward its upper extremity and conforms with the shape of the hollow of the bearing. When the window is raised the bearing 10, 11 carries the clutch with it, but the upward movement thrusts the clutch down upon the ball bearings and it rotates very easily about the shaft 6 permitting the easy ascent of the window, but when the window is lowered the clutch is wedged in its bearing above the ball bearings and forms a friction lock sufficiently strong to securely hold the window in an adjusted open position against the force of gravity. Manual pressure brought to bear upon the window will, however, close it or move it against the action of the clutch.

What is claimed is:—

1. In a sash balance, a spirally grooved shaft disposed in the window casing, a hollow bearing carried by said window and encircling said shaft and means within said hollow bearing engaging the grooved portion of said shaft for facilitating the movement of said bearing over said shaft in one direction and frictionally opposing said movement in the opposite direction.

2. In a sash balance, a spirally grooved shaft disposed in the window casing, a hollow bearing carried by said window and encircling said shaft, a clutch within said bearing, engaging the grooved portion of said shaft, whereby the movement of the bearing over said shaft in one direction is facilitated and said movement in an opposite direction is yieldingly opposed.

3. In a sash balance, a spirally grooved shaft disposed in the window casing, a hollow bearing carried by said window and encircling said shaft, a beveled clutch within said bearing engaging the grooved portion of said shaft to freely permit movement of said bearing over said shaft in one direction and to yieldingly oppose said movement in the opposite direction.

4. In a sash balance, a spirally grooved shaft disposed in the window casing, a hollow bearing carried by said window encircling said shaft, ball bearings carried by said hollow bearing and a beveled clutch disposed within said bearing immediately above said ball bearings and engaging the spirally grooved portion of said shaft to permit movement thereover of the said bearing in one direction and to yieldingly oppose such movement in the opposite direction.

In testimony that I claim the foregoing as my own I have hereto affixed my signature in the presence of two subscribing witnesses.

ERNEST SCHOENHEIT.

Witnesses:
JOHN LUDWIG,
LUDWIG GRUBER.

Copies of this patent may be obtained for five cents each, by addressing the "Commissioner of Patents, Washington, D. C."